US012198532B2

(12) United States Patent
Lang et al.

(10) Patent No.: US 12,198,532 B2
(45) Date of Patent: Jan. 14, 2025

(54) SELF-TESTING FIRE SENSING DEVICE

(71) Applicant: Honeywell International Inc., Charlotte, NC (US)

(72) Inventors: Scott Lang, Geneva, IL (US); Michael Barson, Nuneaton (GB); Benjamin Wolf, Leicester (GB); Christopher Dearden, Melton Mowbray (GB)

(73) Assignee: Honeywell International Inc., Charlotte, NC (US)

(*) Notice: Subject to any disclaimer, the term of this patent is extended or adjusted under 35 U.S.C. 154(b) by 0 days.

(21) Appl. No.: 18/095,633

(22) Filed: Jan. 11, 2023

(65) Prior Publication Data

US 2023/0162593 A1 May 25, 2023

Related U.S. Application Data

(63) Continuation of application No. 17/241,432, filed on Apr. 27, 2021, now Pat. No. 11,580,848, which is a (Continued)

(51) Int. Cl.
*G08B 29/24* (2006.01)
*G08B 17/10* (2006.01)
(Continued)

(52) U.S. Cl.
CPC ............. *G08B 29/24* (2013.01); *G08B 17/10* (2013.01); *G08B 29/20* (2013.01); *G08B 17/06* (2013.01); *G08B 17/113* (2013.01); *G08B 29/145* (2013.01)

(58) Field of Classification Search
CPC ...... G08B 29/14; G08B 29/145; G08B 29/20; G08B 29/22; G08B 29/24; G08B 17/06;
(Continued)

(56) References Cited

U.S. PATENT DOCUMENTS

| | | | |
|---|---|---|---|
| 3,946,374 | A | 3/1976 | McMillian et al. |
| 5,552,765 | A | 9/1996 | Vane et al. |

(Continued)

FOREIGN PATENT DOCUMENTS

| | | | |
|---|---|---|---|
| AU | 2012201531 | A1 | 4/2012 |
| CN | 106150431 | A | 11/2016 |

(Continued)

OTHER PUBLICATIONS

NPL Search (Feb. 7, 2024).*

(Continued)

*Primary Examiner* — Van T Trieu
(74) *Attorney, Agent, or Firm* — Brooks, Cameron & Huebsch, PLLC

(57) ABSTRACT

Devices, methods, and systems for a self-testing fire sensing device are described herein. One device includes an adjustable particle generator and a variable airflow generator configured to generate an aerosol density level, an optical scatter chamber configured to measure a rate at which the aerosol density level decreases after the aerosol density level has been generated, and a controller configured to compare the measured rate at which the aerosol density level decreases with a baseline rate, and determine whether the self-testing fire sensing device requires maintenance based on the comparison of the measured rate at which the aerosol density level decreases and the baseline rate.

19 Claims, 5 Drawing Sheets

Related U.S. Application Data continuation of application No. 16/774,445, filed on Jan. 28, 2020, now Pat. No. 11,024,154.

(51) Int. Cl.

| | |
|---|---|
| ***G08B 29/20*** | (2006.01) |
| *G08B 17/06* | (2006.01) |
| *G08B 17/113* | (2006.01) |
| *G08B 29/14* | (2006.01) |

(58) Field of Classification Search

CPC ...... G08B 17/10; G08B 17/107; G08B 17/11; G08B 17/113; G08B 17/117

See application file for complete search history.

(56) References Cited

U.S. PATENT DOCUMENTS

| | | | | |
|---|---|---|---|---|
| 5,798,701 | A | 8/1998 | Bernal et al. | |
| 5,936,533 | A | 8/1999 | Bernal et al. | |
| 6,396,405 | B1 | 5/2002 | Bernal et al. | |
| 6,456,379 | B1 | 9/2002 | Kunz et al. | |
| 7,934,411 | B2 | 5/2011 | Koch | |
| 8,681,012 | B2 | 3/2014 | Murray et al. | |
| 8,933,811 | B2 | 1/2015 | Højmose | |
| 9,659,485 | B2 | 5/2017 | Piccolo, III | |
| 9,679,468 | B2 * | 6/2017 | Piccolo, III | G08B 29/145 |
| 9,959,748 | B2 | 5/2018 | Moffa | |
| 11,024,154 | B1 | 6/2021 | Lang et al. | |
| 2005/0162173 | A1 | 7/2005 | Mirme | |
| 2006/0113690 | A1 * | 6/2006 | Huddart | A61M 16/1075 261/129 |
| 2007/0233427 | A1 * | 10/2007 | Kaushal | C23C 16/52 700/121 |
| 2011/0100560 | A1 * | 5/2011 | Gerde | B01D 1/18 159/48.1 |
| 2011/0116079 | A1 * | 5/2011 | Tkachuk | G01N 21/61 356/51 |
| 2014/0179019 | A1 | 6/2014 | Dabiri et al. | |
| 2014/0266678 | A1 | 9/2014 | Shapiro et al. | |
| 2015/0096352 | A1 | 4/2015 | Peterson et al. | |
| 2015/0253165 | A1 * | 9/2015 | Ajay | G01F 1/66 73/28.01 |
| 2015/0310732 | A1 | 10/2015 | Piccolo, III | |
| 2016/0042638 | A1 | 2/2016 | Sangha et al. | |
| 2016/0299479 | A1 * | 10/2016 | Hegewald | G01N 33/0006 |
| 2018/0293878 | A1 | 10/2018 | Penney | |
| 2020/0250963 | A1 | 8/2020 | Rodriguez | |
| 2021/0065536 | A1 | 3/2021 | Dearden et al. | |

FOREIGN PATENT DOCUMENTS

| | | | |
|---|---|---|---|
| CN | 208781379 | U | 4/2019 |
| CN | 208938055 | U | 6/2019 |
| DE | 20215640 | U1 | 2/2003 |
| DE | 102010041693 | A1 | 4/2012 |
| DE | 102011088850 | B3 | 4/2013 |
| DE | 102012215212 | A1 | 3/2014 |
| GB | 2176600 | A | 12/1986 |
| GB | 2459322 | A | 10/2009 |
| JP | 2013037426 | A | 2/2013 |
| PL | 191604 | B1 | 6/2006 |
| WO | 0227293 | A2 | 4/2002 |
| WO | 2012041580 | A1 | 4/2012 |
| WO | 2015162530 | A1 | 10/2015 |
| WO | 2018193086 | A1 | 10/2018 |

OTHER PUBLICATIONS

Extended European Search Report for related EP Application No. 21153865.7, mailed on Jun. 11, 2021 (9pgs).

Communication Pursuant to Article 94(3) EPC Examination Report for related European Application No. 21153865.7, mailed on Apr. 22, 2022 (6 pgs).

First Chinese Office Action w/ Search Report for related Chinese Application No. 202110119736.0, mailed on Mar. 22, 2022 (16 pgs total; Original Copy & Translations).

Zhou , et al., "Dirty Plugging Detection of Air Conditioner's Filter Based on Motor Response to Load Changes"; Refrigeration & Air Conditioning, May 31, 2019 (5 pgs) (Original Copy Only).

Second Chinese Office Action w/ Search Report for related Chinese Application No. 202110119736.0, mailed on Aug. 16, 2022 (15 pgs total; Original Copy & Translations).

* cited by examiner

SELF-TESTING FIRE SENSING DEVICE

PRIORITY INFORMATION

This Application is a Continuation of U.S. application Ser. No. 17/241,432 filed Apr. 27, 2021, which issued as U.S. Pat. No. 11,580,848 on Feb. 14, 2023, which is a Continuation of U.S. application Ser. No. 16/774,445, filed Jan. 28, 2020, which issued as U.S. Pat. No. 11,024,154 on Jun. 1, 2021, the contents of which are incorporated herein by reference.

TECHNICAL FIELD

The present disclosure relates generally to devices, methods, and systems for a self-testing fire sensing device.

BACKGROUND

Large facilities (e.g., buildings), such as commercial facilities, office buildings, hospitals, and the like, may have a fire alarm system that can be triggered during an emergency situation (e.g., a fire) to warn occupants to evacuate. For example, a fire alarm system may include a fire control panel and a plurality of fire sensing devices (e.g., smoke detectors), located throughout the facility (e.g., on different floors and/or in different rooms of the facility) that can sense a fire occurring in the facility and provide a notification of the fire to the occupants of the facility via alarms.

Maintaining the fire alarm system can include regular testing of fire sensing devices mandated by codes of practice in an attempt to ensure that the fire sensing devices are functioning properly. However, since tests may only be completed periodically, there is a risk that faulty fire sensing devices may not be discovered quickly or that tests will not be carried out on all the fire sensing devices in a fire alarm system.

A typical test includes a maintenance engineer using pressurized aerosol to force synthetic smoke into a chamber of a fire sensing device, which can saturate the chamber. In some examples, the maintenance engineer can also use a heat gun to raise the temperature of a heat sensor in a fire sensing device and/or a gas generator to expel carbon monoxide (CO) gas into a fire sensing device. These tests may not accurately mimic the characteristics of a fire and as such, the tests may not accurately determine the ability of a fire sensing device to detect an actual fire.

Also, this process of manually testing each fire sensing device can be time consuming, expensive, and disruptive to a business. For example, a maintenance engineer is often required to access fire sensing devices which are situated in areas occupied by building users or parts of buildings that are often difficult to access (e.g., elevator shafts, high ceilings, ceiling voids, etc.). As such, the maintenance engineer may take several days and several visits to complete testing of the fires sensing devices, particularly at a large site. Additionally, it is often the case that many fire sensing devices never get tested because of access issues.

Over time a fire sensing device can become dirty with dust and debris, for example, and become clogged. A clogged fire sensing device can prevent air and/or particles from passing through the fire sensing device to sensors in the fire sensing device, which can prevent a fire sensing device from detecting smoke, fire, and/or carbon monoxide.

DETAILED DESCRIPTION

Figure 1:
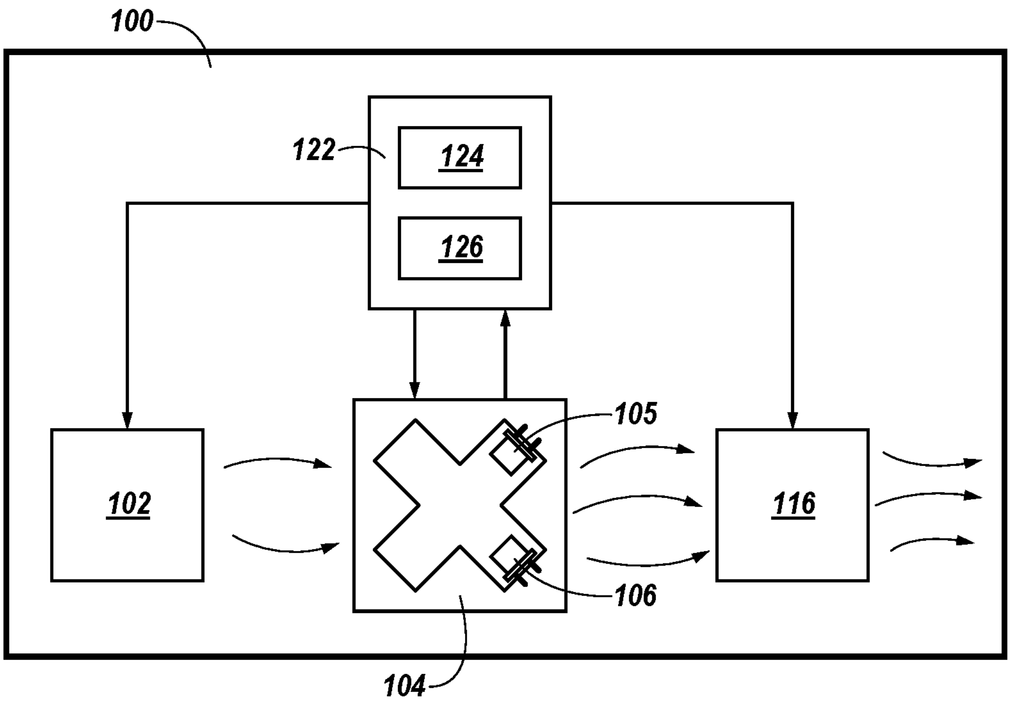
FIG. 1 illustrates a block diagram of a self-test function of a fire sensing device in accordance with an embodiment of the present disclosure.

Devices, methods, and systems for a self-testing fire sensing device are described herein. One device includes an adjustable particle generator and a variable airflow generator configured to generate an aerosol density level, an optical scatter chamber configured to measure a rate at which the aerosol density level decreases after the aerosol density level has been generated, and a controller configured to compare the measured rate at which the aerosol density level decreases with a baseline rate, and determine whether the fire sensing device requires maintenance based on the comparison of the measured rate at which the aerosol density level decreases and the baseline rate.

In contrast to previous fire sensing devices in which a maintenance engineer would have to manually inspect and/or test (e.g., using pressurized aerosol, a heat gun, a gas generator, or any combination thereof) each fire sensing device to determine whether a fire sensing device required maintenance, fire sensing devices in accordance with the present disclosure can determine how dirty (e.g., clogged) they are without testing or inspection by a maintenance engineer. For example, fire sensing devices in accordance with the present disclosure can utilize a baseline rate at which the aerosol density level in the fire sensing device decreases to determine trends in the amount of time needed to clear the fire sensing device, which can indicate whether maintenance of the device is required. Accordingly, fire sensing devices in accordance with the present disclosure may determine whether and/or when the fire sensing devices require maintenance without manual testing and/or inspection by a maintenance engineer.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 illustrates a block diagram of a self-test function of a fire sensing device 100 in accordance with an embodiment of the present disclosure. The fire sensing device 100 includes a controller (e.g., microcontroller) 122, an adjustable particle generator 102, an optical scatter chamber 104, and a variable airflow generator 116.

The microcontroller 122 can include a memory 124 and a processor 126. Memory 124 can be any type of storage medium that can be accessed by processor 126 to perform various examples of the present disclosure. For example, memory 124 can be a non-transitory computer readable medium having computer readable instructions (e.g., computer program instructions) stored thereon that are executable by processor 126 to test a fire sensing device 100 in accordance with the present disclosure. For instance, processor 126 can execute the executable instructions stored in memory 124 to generate an aerosol density level, measure a rate at which the aerosol density level decreases after the aerosol density level has been generated, compare the measured rate at which the aerosol density level decreases with a baseline rate, and determine whether the fire sensing device 100 requires maintenance based on the comparison of the measured rate and the baseline rate. In some examples, memory 124 can store the baseline rate and/or the measured rate.

For example, the microcontroller 122 can send a command to the adjustable particle generator 102 to generate particles. The particles can be drawn through the optical scatter chamber 104 via the variable airflow generator 116 creating a controlled aerosol density level. The aerosol density level can be sufficient to trigger a fire response without saturating the optical scatter chamber. As shown in FIG. 1, the optical scatter chamber 104 can include a transmitter light-emitting diode (LED) 105 and a receiver photodiode 106 to measure the aerosol density level. The aerosol density level can be measured a number of times over a time period by the optical scatter chamber 104. The rate at which the aerosol density level decreases can be determined based on the number of aerosol density level measurements over the time period.

Once the rate at which the aerosol density level decreases is determined, the fire sensing device 100 can store the rate in memory 124. The measured rate at which the aerosol density level decreases can be stored in memory 124 as a baseline rate if, for example, the measured rate is the first (e.g., initial) measured rate at which the aerosol density level decreases in the fire sensing device 100. If the fire sensing device 100 already has a baseline rate, then the measured rate can be stored in memory 124 as a subsequently measured rate at which the aerosol density level decreases.

In some examples, the fire sensing device 100 can determine whether the fire sensing device 100 requires maintenance by comparing the subsequently measured rate at which the aerosol density level decreases with the baseline rate. For example, the fire sensing device 100 may require maintenance when the difference between the measured rate and the baseline rate is greater than a threshold value. The threshold value can be set by a manufacturer, according to regulations, and/or set based on the baseline rate, for example.

In some examples, the microcontroller 122 can determine when the fire sensing device 100 will reach a particular rate at which the aerosol density level will decrease based on the measured rate at which the aerosol density level decreases, and previously measured rates at which the aerosol density level decreased. For example, the microcontroller 122 can extrapolate the measured rate and the previously measured rates to determine a date when the fire sensing device 100 will reach a particular rate at which the aerosol density level decreases. This particular rate of reduction in the aerosol density level can be when the fire sensing device 100 is fully masked (e.g., clogged) and/or when the fire sensing device 100 is masked enough to make the fire sensing device 100 unreliable, for example.

The measured rate at which the aerosol density level decreases can also be used to determine the amount of soiling (e.g., masking, clogging, soiling, etc.) of the optical scatter chamber 104. For example, the lower the measured rate of reduction in the aerosol density level, the higher the percentage of soiling of the optical scatter chamber 104.

Figure 2:
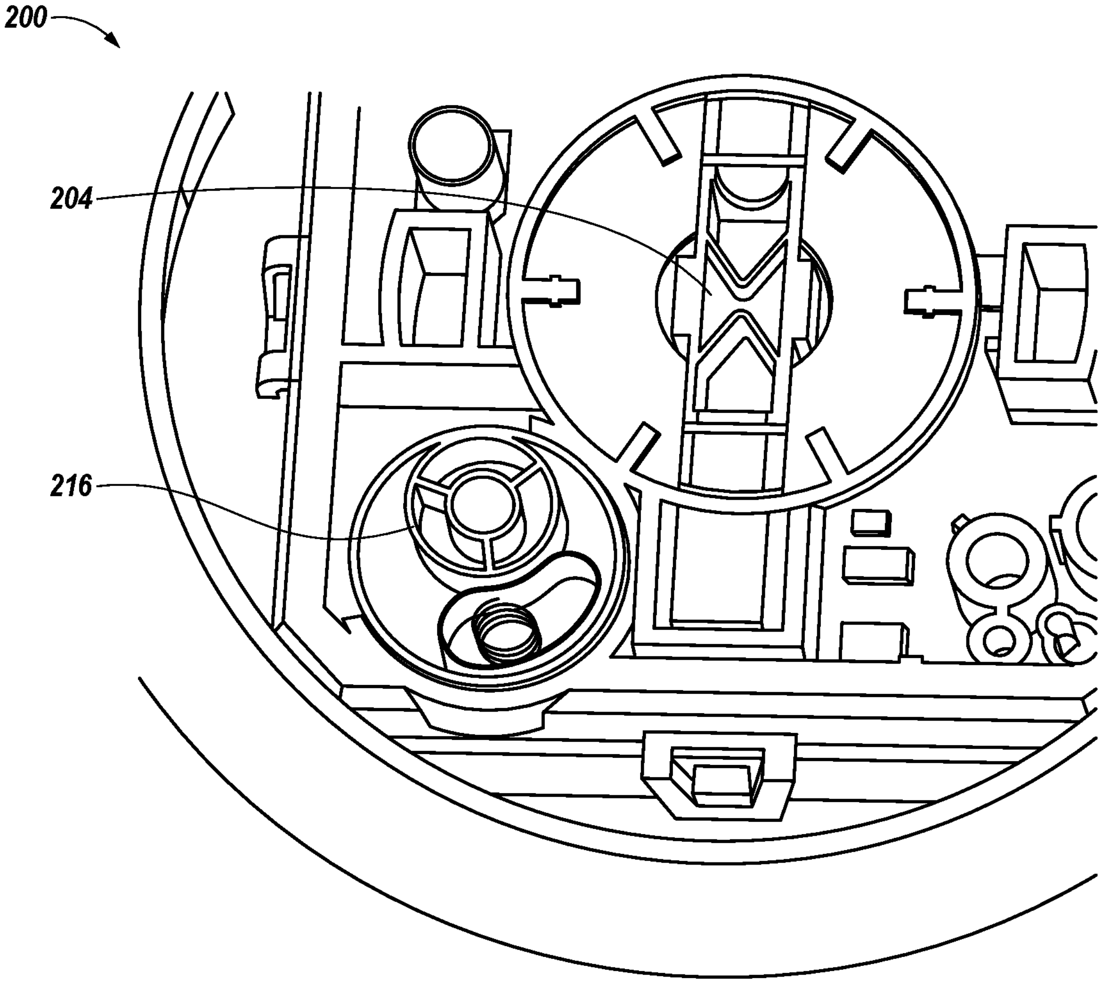
FIG. 2 illustrates a portion of an example of a self-testing fire sensing device in accordance with an embodiment of the present disclosure.

FIG. 2 illustrates a portion of an example of a self-testing fire sensing device 200 in accordance with an embodiment of the present disclosure. The fire sensing device 200 can be, but is not limited to, a fire and/or smoke detector of a fire control system.

A fire sensing device 200 can sense a fire occurring in a facility and trigger a fire response to provide a notification of the fire to occupants of the facility. A fire response can include visual and/or audio alarms, for example. A fire response can also notify emergency services (e.g., fire departments, police departments, etc.) In some examples, a plurality of fire sensing devices can be located throughout a facility (e.g., on different floors and/or in different rooms of the facility).

A fire sensing device 200 can automatically or upon command conduct one or more tests contained within the fire sensing device 200. The one or more tests can determine whether the fire sensing device 200 is functioning properly and/or requires maintenance.

As shown in FIG. 2, fire sensing device 200 can include an optical scatter chamber 204 and a variable airflow generator 216, which can correspond to the optical scatter chamber 104 and the variable airflow generator 116 of FIG. 1, respectively. Further fire sensing device 200 can also include a controller and an adjustable particle generator analogous to those of FIG. 1. Further, the functionality of optical scatter chamber 204 and variable airflow generator 216 can be analogous to that further described herein for chamber 304 and variable airflow generator 316 in connection with FIG. 3.

Figure 3:
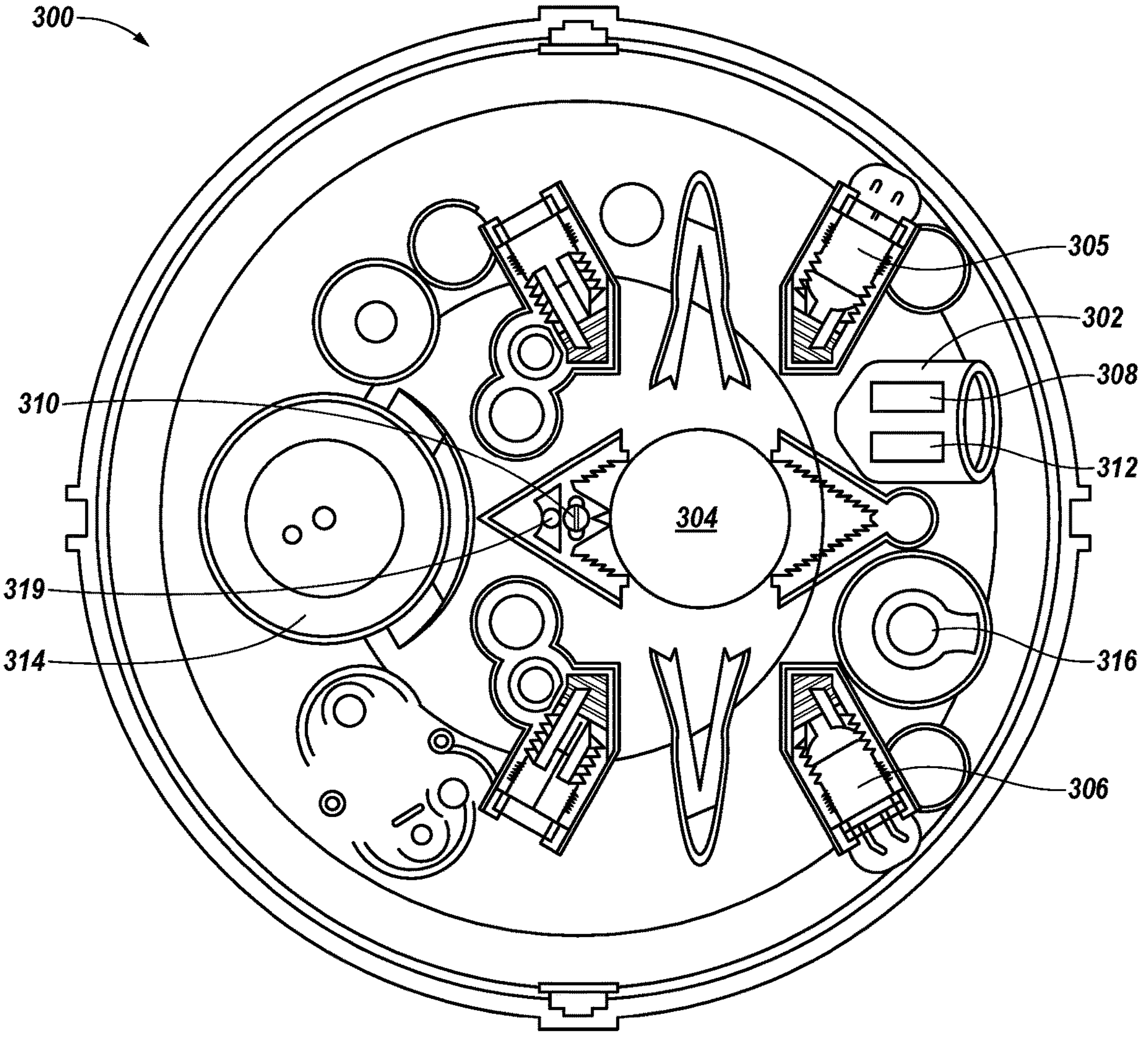
FIG. 3 illustrates an example of a self-testing fire sensing device in accordance with an embodiment of the present disclosure.

FIG. 3 illustrates an example of a self-testing fire sensing device 300 in accordance with an embodiment of the present disclosure. The fire sensing device 300 can be, but is not limited to, a fire and/or smoke detector of a fire control system.

A fire sensing device 300 can sense a fire occurring in a facility and trigger a fire response to provide a notification of the fire to occupants of the facility. In some examples, a plurality of fire sensing devices can be located throughout a facility (e.g., on different floors and/or in different rooms of the facility).

A fire sensing device 300 can automatically or upon command conduct one or more tests contained within the fire sensing device 300. The one or more tests can determine whether the fire sensing device 300 is functioning properly and/or requires maintenance.

As shown in FIG. 3, fire sensing device 300 can include an adjustable particle generator 302, an optical scatter chamber 304 including a transmitter light-emitting diode (LED) 305 and a receiver photodiode 306, a heat source 308, a heat sensor 310, a gas source 312, a gas sensor 314, a variable airflow generator 316, and an additional heat source 319. In some examples, a fire sensing device 300 can also include a microcontroller including memory and/or a processor, as previously described in connection with FIG. 1.

The adjustable particle generator 302 of the fire sensing device 300 can generate particles which can be mixed into a controlled aerosol density level by the variable airflow generator 316. The aerosol density level can be a particular level that can be detected by an optical scatter chamber 304. Once the aerosol density level has reached the particular level, the adjustable particle generator 316 can be turned off and the variable airflow generator 316 can increase the rate of airflow through the optical scatter chamber 304. The variable airflow generator 316 can increase the rate of airflow through the optical scatter chamber 304 to reduce the aerosol density level back to an initial level of the optical scatter chamber 304 prior to the adjustable particle generator 316 generating particles. For example, the variable airflow generator 316 can remove the aerosol from the optical scatter chamber 304 after the rate in reduction of aerosol density is determined. If the fire sensing device 300 is not blocked or covered, then airflow from the external environment through the optical scatter chamber 304 will cause the aerosol density level to decrease. The rate at which the aerosol density level decreases indicates whether the sensing device 300 is impeded and whether the sensing device 300 could require maintenance.

The adjustable particle generator 302 can include a reservoir to contain a liquid and/or wax used to create particles. The adjustable particle generator 302 can also include a heat source, which can be heat source 308 or a different heat source. The heat source 308 can be a coil of resistance wire. A current flowing through the wire can be used to control the temperature of the heat source 308 and further control the number of particles produced by the adjustable particle generator 302. The heat source 308 can heat the liquid and/or wax to create airborne particles to simulate smoke from a fire. The particles can measure approximately 1 micrometer in diameter and/or the particles can be within the sensitivity range of the optical scatter chamber 304. The heat source 308 can heat the liquid and/or wax to a particular temperature and/or heat the liquid and/or wax for a particular period of time to generate an aerosol density level sufficient to trigger a fire response from a properly functioning fire sensing device without saturating the optical scatter chamber 304 and/or generate an aerosol density level sufficient to test a fault condition without triggering a fire response or saturating the optical scatter chamber 304. The ability to control the aerosol density level can allow a smoke test to more accurately mimic the characteristics of a fire and prevent the optical scatter chamber 304 from becoming saturated.

The optical scatter chamber 304 can sense the external environment due to a baffle opening in the fire sensing device 300 that allows air and/or smoke from a fire to flow through the fire sensing device 300. The optical scatter chamber 304 can measure the aerosol density level. In some examples a different measurement device can be used to measure the aerosol density level through the fire sensing device 300.

As previously discussed, the rate at which aerosol density level decreases can be used to determine whether fire sensing device 300 requires maintenance. For example, the fire sensing device 300 can be determined to require maintenance responsive to a difference between the measured rate and the baseline rate being greater than a threshold value.

In some examples, the fire sensing device 300 can generate a message if the device requires maintenance (e.g., if the difference between the measured rate and the baseline rate is greater than a threshold value). The fire sensing device 300 can send the message to a monitoring device and/or a mobile device, for example. As an additional example, the fire sensing device 300 can include a user interface that can display the message.

The fire sensing device 300 can include an additional heat source 319, but may not require an additional heat source 319 if the heat sensor 310 is self-heated. In some examples, heat source 319 can generate heat at a temperature sufficient to trigger a fire response from a properly functioning heat sensor 310. The heat source 319 can be turned on to generate heat during a heat self-test. Once the heat self-test is complete, the heat source 119 can be turned off to stop generating heat.

The heat sensor 310 can normally be used to detect a rise in temperature caused by a fire. Once the heat source 319 is turned off, the heat sensor 310 can measure a rate of reduction in temperature. The rate of reduction in temperature can be used to determine whether the fire sensing device 300 is functioning properly and/or whether the fire sensing device 300 is dirty. The rate of reduction in temperature and can be used to determine whether the fire sensing device 300 requires maintenance. Maintenance can include cleaning the fire sensing device 300 so that clean air is able to enter the fire sensing device 300 and reach the heat sensor 310.

A message can be generated by the fire sensing device 300 if the device requires maintenance (e.g., if the difference between the measured rate and a baseline rate is greater than a threshold value). In some examples, the message can be sent to a monitoring device and/or a mobile device. As an additional example, the fire sensing device 300 can include a user interface that can display the message.

A gas source 312 can be separate and/or included in the adjustable particle generator 302, as shown in FIG. 3. The gas source 312 can be configured to release one or more gases. The one or more gases can be produced by combustion. In some examples, the one or more gases can be carbon monoxide (CO) and/or a cross-sensitive gas. The gas source 312 can generate gas at a gas level sufficient to trigger a fire response from a properly functioning fire sensing device 300 and/or trigger a fault in a properly functioning gas sensor 314.

The gas sensor 314 can detect one or more gases in the fire sensing device 300, such as, for example, the one or more gases released by the gas source 312. For example, the gas sensor 314 can detect CO and/or cross-sensitive gases. In some examples, the gas sensor 314 can be a CO detector. Once the gas source 312 is turned off, the gas sensor 314 can measure the gas level and determine the change in gas level over time (e.g., rate of reduction in gas level) to determine whether the fire sensing device 300 is functioning properly and/or whether the fire sensing device 300 is dirty.

The rate of reduction in the gas level can be used to determine whether the fire sensing device 300 requires maintenance. Maintenance can include cleaning the fire sensing device 300 so that air is able to enter the fire sensing device 300 and reach the gas sensor 314.

In some examples, the fire sensing device 300 can generate a message if the device requires maintenance (e.g., if the difference between the measured rate and the baseline rate is greater than a threshold value). The fire sensing device 300 can send the message to a monitoring device and/or a mobile device, for example. As an additional example, the fire sensing device 300 can include a user interface that can display the message.

The variable airflow generator 316 can control the airflow through the fire sensing device 300, including the optical scatter chamber 304. For example, the variable airflow generator 316 can move gases and/or aerosol from a first end of the fire sensing device 300 to a second end of the fire sensing device 300. In some examples, the variable airflow generator 316 can be a fan. The variable airflow generator 316 can start responsive to the adjustable particle generator 302, the heat source 319, and/or the gas source 312 starting. The variable airflow generator 316 can stop responsive to the adjustable particle generator 302, the heat source 319, and/or the gas source 312 stopping, and/or the variable airflow generator 316 can stop after a particular period of time after the adjustable particle generator 302, the heat source 319, and/or the gas source 312 has stopped.

Figure 4:
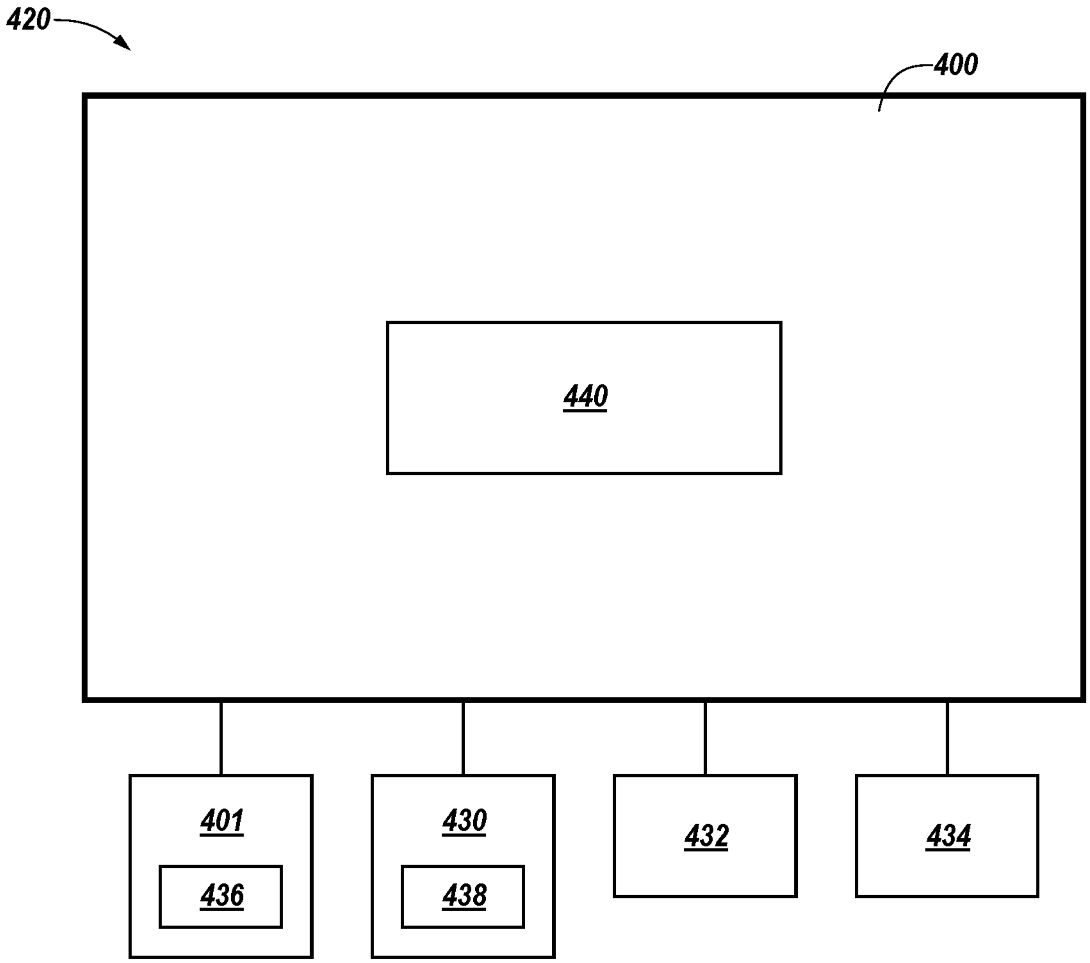
FIG. 4 illustrates a block diagram of a self-test function of a system in accordance with an embodiment of the present disclosure.

FIG. 4 illustrates a block diagram of a self-test function of a system 420 in accordance with an embodiment of the present disclosure. The system 420 can include a fire sensing device 400, a monitoring device 401, a computing device 430, a sensor 432, and a heating, ventilation, and air conditioning (HVAC) system 434. Fire sensing device 400 can be, for example, fire sensing device 100, 200, and/or 300 previously described in connection with FIGS. 1, 2, and 3, respectively.

The fire sensing device 400 can include a user interface 440. The user interface 440 can be a graphical user interface (GUI) that can provide and/or receive information to and/or from the user, the monitoring device 401, and/or the computing device 430. In some examples, the user interface 440 can display a message. The message can be displayed responsive to determining the fire sensing device 400 requires maintenance, for example.

The monitoring device 401 can be a control panel, a fire detection control system, and/or a cloud computing device of a fire alarm system. The monitoring device 401 can be configured to send commands to and/or receive test results from a fire sensing device 400 via a wired or wireless network. For example, the fire sensing device 400 can transmit (e.g., send) the monitoring device 401 a message responsive to the fire sensing device 400 determining that the fire sensing device 400 requires maintenance and/or the fire sensing device 400 can send the monitoring device 401 a determined date when the fire sensing device 400 will reach a particular rate at which aerosol density level will decrease.

The monitoring device 401 can receive messages from a number of fire sensing devices analogous to fire sensing device 400. For example, the monitoring device 401 can receive a determined date from each of a number of fire sensing devices analogous to fire sensing device 400 and create a maintenance schedule based on the determined dates from each of the number of fire sensing devices.

In a number of embodiments, the monitoring device 401 can include a user interface 436. The user interface 436 can be a GUI that can provide and/or receive information to and/or from a user and/or the fire sensing device 400. The user interface 436 can display messages and/or data received from the fire sensing device 400. For example, the user interface 436 can notify a user of the date when the fire sensing device 400 will reach a particular rate of reduction by displaying the determined date on the user interface 436 and/or can display a message that fire sensing device 400 requires maintenance.

In a number of embodiments, computing device 430 can receive the message and/or determined date from fire sensing device 400 and/or monitoring device 401 via a wired or wireless network. For example, the monitoring device 401 can notify a user at the computing device 430 responsive to the determined date being within a particular time period. The computing device 430 can be a personal laptop computer, a desktop computer, a mobile device such as a smart phone, a tablet, a wrist-worn device, and/or redundant combinations thereof, among other types of computing devices.

In some examples, a computing device 430 can include a user interface 438 to display messages from the monitoring device 401 and/or the fire sensing device 400. For example, the user interface 438 can display the determined date. The user interface 438 can be a GUI that can provide and/or receive information to and/or from the user, the monitoring device 401, and/or the fire sensing device 400.

The system 420 can include a sensor 432. The sensor 432 can be coupled to and/or placed near the fire sensing device 400 and can communicate with the fire sensing device 400 via a wired or wireless network. The sensor 432 can measure ambient airflow outside of the fire sensing device 400. The sensor 432 can be a thermistor or a hot-wire anemometer, for example. The ambient airflow measurement can be used by fire sensing device 400 in determining which baseline rate to compare the measured rate to in order to determine whether the fire sensing device 400 requires maintenance and/or when the fire sensing device 400 requires maintenance.

In a number of embodiments, the system 420 can include an HVAC system 434. The HVAC system 434 can communicate with the fire sensing device 400 via a wired or wireless network. The HVAC system 434 can send an input to the fire sensing device 400 responsive to the HVAC system 434 changing modes (e.g., turning off, turning on, etc.). The fire sensing device 400 including the microcontroller (e.g., microcontroller 122 in FIG. 1) can receive the input from the HVAC system 434. Responsive to receiving the input, the fire sensing device 400 can determine to use a particular baseline rate and/or a particular baseline rate range to compare the measured rate to in order to determine whether a fire sensing device 400 requires maintenance. For example, a baseline rate range can include a first baseline rate when the HVAC system 434 is on and a second baseline rate when the HVAC system is off. The baseline rate range can be determined by measuring a rate at which the aerosol density level decreases when the HVAC system 434 is on and measuring a rate at which the aerosol density level decreases when the HVAC system 434 is off.

The networks described herein can be a network relationship through which fire sensing device 400, monitoring device 401, computing device 430, sensor 432, and/or HVAC system 434 can communicate with each other. Examples of such a network relationship can include a distributed computing environment (e.g., a cloud computing environment), a wide area network (WAN) such as the Internet, a local area network (LAN), a personal area network (PAN), a campus area network (CAN), or metropolitan area network (MAN), among other types of network relationships. For instance, the network can include a number of servers that receive information from, and transmit information to fire sensing device 400, monitoring device 401, computing device 430, sensor 432, and/or HVAC system 434 via a wired or wireless network.

As used herein, a "network" can provide a communication system that directly or indirectly links two or more computers and/or peripheral devices and allows a monitoring device 401, a computing device 430, a sensor 432, and/or an HVAC system 434 to access data and/or resources on a fire sensing device 400 and vice versa. A network can allow users to share resources on their own systems with other network users and to access information on centrally located systems or on systems that are located at remote locations. For example, a network can tie a number of computing devices together to form a distributed control network (e.g., cloud).

A network may provide connections to the Internet and/or to the networks of other entities (e.g., organizations, institutions, etc.). Users may interact with network-enabled software applications to make a network request, such as to get data. Applications may also communicate with network management software, which can interact with network hardware to transmit information between devices on the network.

Figure 5:
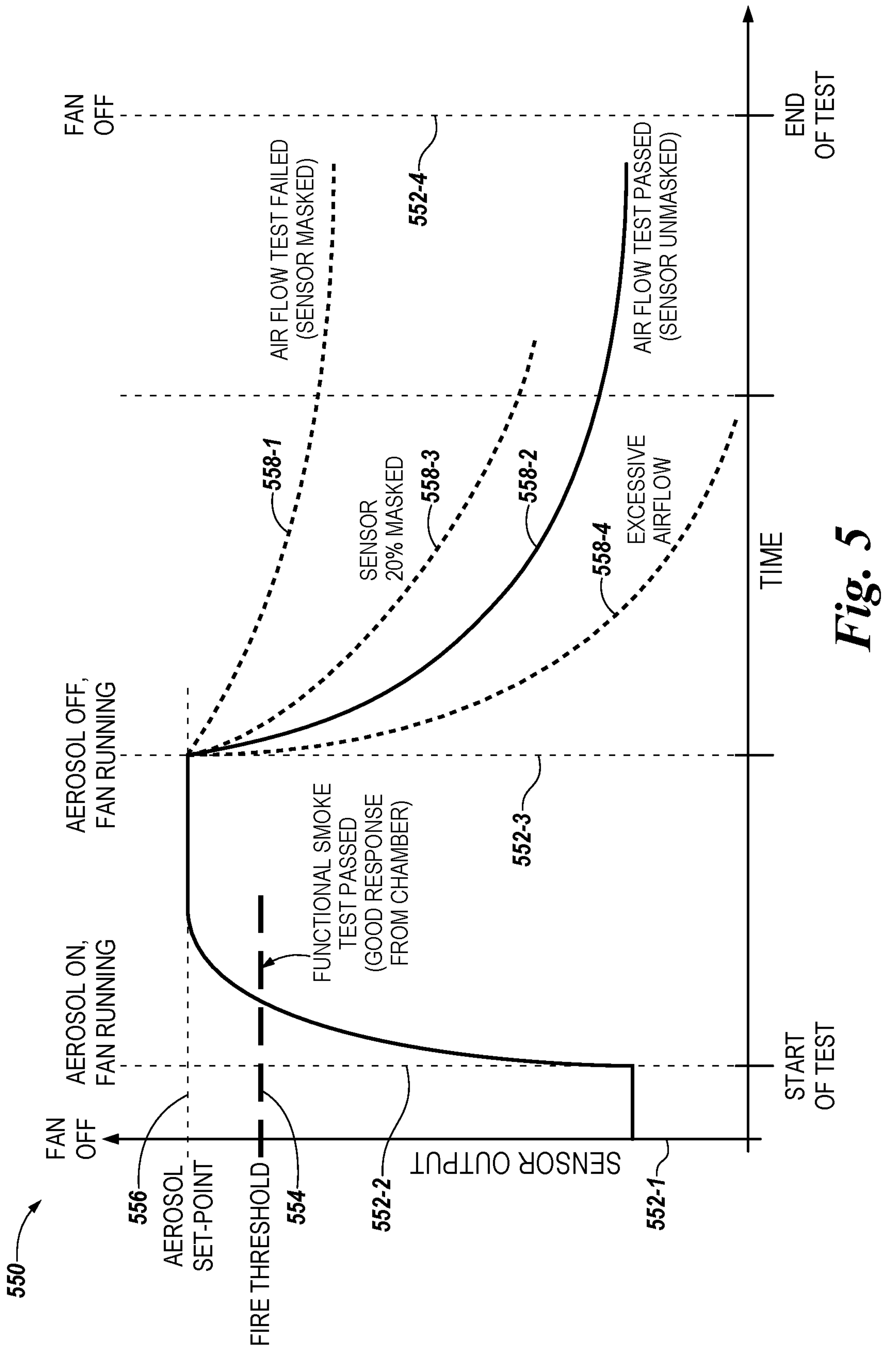
FIG. 5 illustrates a plot of example optical scatter chamber outputs used to determine whether a fire sensing device requires maintenance in accordance with an embodiment of the present disclosure.

FIG. 5 illustrates a plot (e.g., graph) 550 of example optical scatter chamber (e.g., sensor) outputs 558-1, 558-2, 558-3, and 558-4 used to determine whether a fire sensing device (e.g., fire sensing device 100, 200, 300, or 400 previously described herein) requires maintenance in accordance with an embodiment of the present disclosure. The optical scatter chamber outputs 558-1, 558-2, 558-3, 558-4 can be a rate at which aerosol density level decreases.

In the example illustrated in FIG. 5, a variable airflow generator (e.g., variable airflow generator 116, 216, or 316 previously described herein) and an adjustable particle generator (e.g., adjustable particle generator 102 or 302 previously described herein) can be powered off (e.g., turned off) at time 552-1. At time 552-2, the variable airflow generator and the adjustable particle generator can be powered on (e.g., turned on) to start a smoke self-test function, as previously described in connection with FIGS. 1 and 3. When powered on the adjustable particle generator (e.g., fan) can generate particles (e.g., aerosol particles) and the generated particles can be mixed into a controlled aerosol density level by the variable airflow generator. The variable airflow generator can move the generated particles through an optical scatter chamber (e.g., optical scatter chamber 104, 204, or 304 previously described herein). The optical scatter chamber can determine the rate at which the aerosol density level decreases after the aerosol has been generated.

Particles can be generated until a threshold aerosol density level (e.g., set-point) 556 is met. The threshold aerosol density level can be a sufficient aerosol density level to trigger a fire response (e.g., fire threshold) 554 from a properly functioning fire sensing device without saturating an optical scatter chamber, for example. Once the threshold aerosol density level 556 is met, the adjustable particle generator can stop generating particles at time 552-3 and the variable airflow generator can continue and/or increase the airflow, moving the generated particles through the optical scatter chamber.

The measured aerosol density level after the adjustable particle generator has stopped can reduce over time, as shown by the example optical scatter chamber outputs 558-1, 558-2, 558-3, and 558-4. In the example optical scatter chamber output 588-1, the aerosol density level remains higher than the example optical scatter chamber output 558-2 after the adjustable particle generator stops generating particles. The example optical scatter chamber output 588-1 illustrates an impeded airflow through the optical scatter chamber where the optical scatter chamber is masked, and the fire sensing device cannot function properly.

Responsive to the output 558-1, the fire sensing device can determine that the fire sensing device requires maintenance. In some examples, the fire sensing device can compare the measured rate, for example, 558-1 with a baseline rate, for example, 558-2. The fire sensing device can determine the fire sensing device requires maintenance responsive to a difference between the measured rate and the baseline rate being greater than a threshold value.

In a number of embodiments, the fire sensing device can extrapolate the measured rate to determine a date when the fire sensing device will reach a particular rate of decrease in the aerosol density level. For example, the fire sensing device can determine the fire sensing device will reach a 20 particles per second rate of reduction represented by example output 558-1 in two days if today the fire sensing device was at a 40 particles per second rate of reduction represented by example output 558-3 and the day before yesterday the fire sensing device was at a 50 particles per second rate of reduction represented by example output 558-2.

In some examples, the rate at which the aerosol density level decreases can identify when the fire sensing device has excessive airflow, as represented by example output 558-4. An excessive airflow can be due to ambient airflow outside of the fire sensing device, for example, an HVAC system running near the fire sensing device. The fire sensing device can have a different baseline rate to compare the measured rate to when and HVAC system is running. In some examples, the fire sensing device can determine the fire sensing device is not functioning correctly and may require maintenance responsive to an excessive airflow rate output 558-4.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising:

a self-testing fire sensing device, comprising a controller configured to:

determine a baseline rate based on a measurement of ambient airflow performed by a sensor outside the self-testing fire sensing device, wherein the determined baseline rate differs when the measured ambient airflow exceeds a threshold airflow rate;

compare a measured rate at which a temperature decreases within the self-testing fire sensing device with the baseline rate; and determine whether the self-testing fire sensing device requires maintenance based on the comparison of the measured rate at which the temperature decreases and the baseline rate.

2. The system of claim 1, wherein the sensor is coupled to the self-testing fire sensing device.

3. The system of claim 1, wherein the sensor is a thermistor.

4. The system of claim 3, wherein the thermistor is a hot-wire anemometer.

5. The system of claim 1, wherein the controller is configured to determine a time at which the self-testing fire sensing device will require maintenance based on the comparison of the measured rate at which the temperature decreases and the baseline rate.

6. The system of claim 1, wherein the self-testing fire sensing device further comprises a heat source configured to generate heat in the self-testing fire sensing device.

7. The system of claim 6, wherein the self-testing fire sensing device further comprises a heat sensor configured to measure the rate at which the temperature within the self-testing fire sensing device decreases after the heat has been generated.

8. A system, comprising:

a self-testing fire sensing device, comprising a controller configured to:

determine a baseline rate based on a measurement of ambient airflow performed by a sensor outside the self-testing fire sensing device, wherein the determined baseline rate differs when the measured ambient airflow exceeds a threshold airflow rate;

compare a measured rate at which a gas level decreases within the self-testing fire sensing device with the baseline rate; and determine whether the self-testing fire sensing device requires maintenance based on the comparison of the measured rate at which the gas level decreases and the baseline rate.

9. The system of claim 8, wherein the controller is configured to determine a time at which the self-testing fire sensing device will require maintenance based on the comparison of the measured rate at which the gas level decreases and the baseline rate.

10. The system of claim 8, wherein the self-testing fire sensing device further comprises a gas source configured to release one or more gases in the self-testing fire sensing device.

11. The system of claim 10, wherein the gas source is configured to generate the one or more gases via combustion.

12. The system of claim 10, wherein the one or more gases include carbon monoxide (CO).

13. The system of claim 10, wherein the self-testing fire sensing device further comprises a gas sensor configured to measure the rate at which the gas level within the self-testing fire sensing device decreases after the one or more gases have been released.

14. The system of claim 13, wherein the gas sensor is a carbon monoxide (CO) detector.

15. A system, comprising:

a self-testing fire sensing device, comprising a controller configured to:

determine a baseline rate based on a measurement of ambient airflow performed by a sensor outside the self-testing fire sensing device, wherein the determined baseline rate differs when the measured ambient airflow exceeds a threshold airflow rate;

compare a measured rate at which aerosol density level decreases within the self-testing fire sensing device with the baseline rate; and determine whether the self-testing fire sensing device requires maintenance based on the comparison of the measured rate at which the aerosol density level decreases and the baseline rate.

16. The system of claim 15, further comprising a monitoring device, wherein the controller is configured to transmit a message to the monitoring device responsive to the self-test fire sensing device determining the self-testing fire sensing device requires maintenance.

17. The system of claim 15, wherein the controller is configured to determine a time at which the self-testing fire sensing device will require maintenance based on the comparison of the measured rate at which the aerosol density level decreases and the baseline rate.

18. The system of claim 15, wherein the self-testing fire sensing device further comprises an adjustable particle generator and a variable airflow generator configured to generate the aerosol density level within the self-testing fire sensing device.

19. The system of claim 18, wherein the self-testing fire sensing device further comprises an optical scatter chamber configured to measure the rate at which the aerosol density level decreases after the aerosol density level has been generated.

* * * * *